United States Patent
Jayakrishnasamy

(10) Patent No.: US 12,468,891 B2
(45) Date of Patent: Nov. 11, 2025

(54) SYSTEMS AND METHODS FOR UTILIZING A MACHINE LEARNING MODEL FOR SENTENCE BOUNDARY DETECTION

(71) Applicant: Verizon Patent and Licensing Inc., Basking Ridge, NJ (US)

(72) Inventor: Miruna Jayakrishnasamy, Vellore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 168 days.

(21) Appl. No.: 18/542,911

(22) Filed: Dec. 18, 2023

(65) Prior Publication Data
US 2025/0200285 A1    Jun. 19, 2025

(51) Int. Cl.
*G06F 40/289* (2020.01)
*G06F 40/253* (2020.01)
*G06Q 50/18* (2012.01)

(52) U.S. Cl.
CPC .......... *G06F 40/289* (2020.01); *G06F 40/253* (2020.01); *G06Q 50/18* (2013.01)

(58) Field of Classification Search
None
See application file for complete search history.

(56) References Cited

U.S. PATENT DOCUMENTS

| | | | |
|---|---|---|---|
| 9,613,025 B2* | 4/2017 | Heo | G06F 40/30 |
| 2018/0287968 A1* | 10/2018 | Koukoumidis | G06F 40/289 |
| 2022/0121820 A1* | 4/2022 | Chopra | G06F 16/35 |

* cited by examiner

*Primary Examiner* — Aneeta Yodichkas

(57) ABSTRACT

A device may receive text data, may extract phrases from the text data, and may calculate question scores for the phrases. The device may determine whether the phrases are associated with single answers or multiple answers, may calculate, single answer scores for the phrases associated with the single answers, and may calculate multiple answer scores for the phrases associated with the multiple answers. The device may extract, from the phrases, phrase data identifying grammar data, start tag data, and end tag data, and may process the phrase data, the single answer scores, and the multiple answer scores, with a machine learning model, to generate valid sentence scores for the text data. The device may identify, as a valid sentence, a group of phrases of the text data associated with a highest one of the valid sentence scores, and may add punctuation to the valid sentence to generate a final sentence.

20 Claims, 12 Drawing Sheets

100 ⟶

Data structure 105

115
Receive text data that includes phrases ⟶

120
Extract the phrases from the text data

Detection system 110

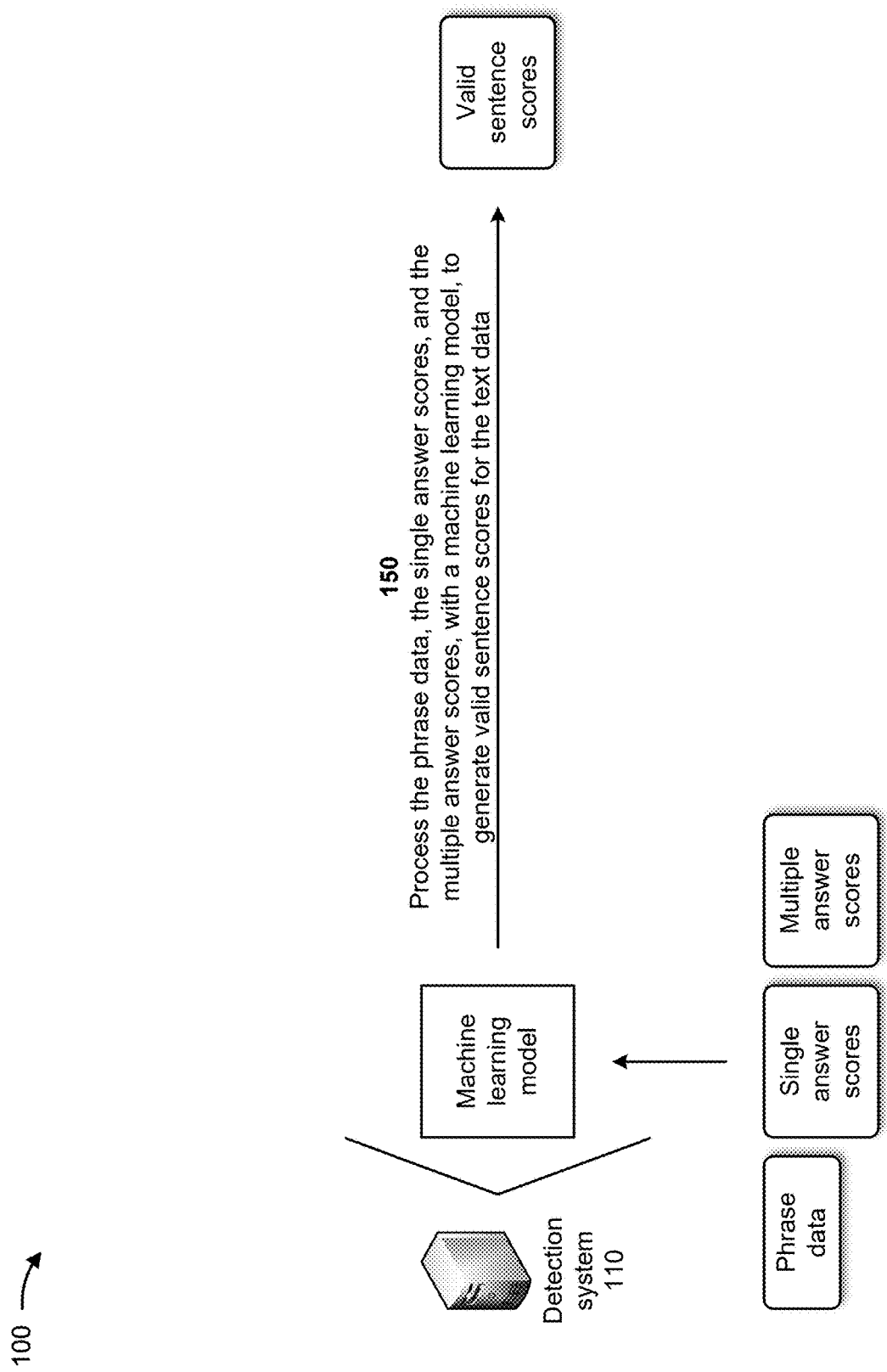

SYSTEMS AND METHODS FOR UTILIZING A MACHINE LEARNING MODEL FOR SENTENCE BOUNDARY DETECTION

BACKGROUND

Natural language processing (NLP) refers to a branch of artificial intelligence (AI) concerned with enabling computers to understand text and spoken words in much the same way human beings understand text and spoken words.

BRIEF DESCRIPTION OF THE DRAWINGS

FIGS. 1A-1H are diagrams of an example associated with utilizing one or more machine learning models for sentence boundary detection.

DETAILED DESCRIPTION OF EXAMPLE EMBODIMENTS

Figure 1A:
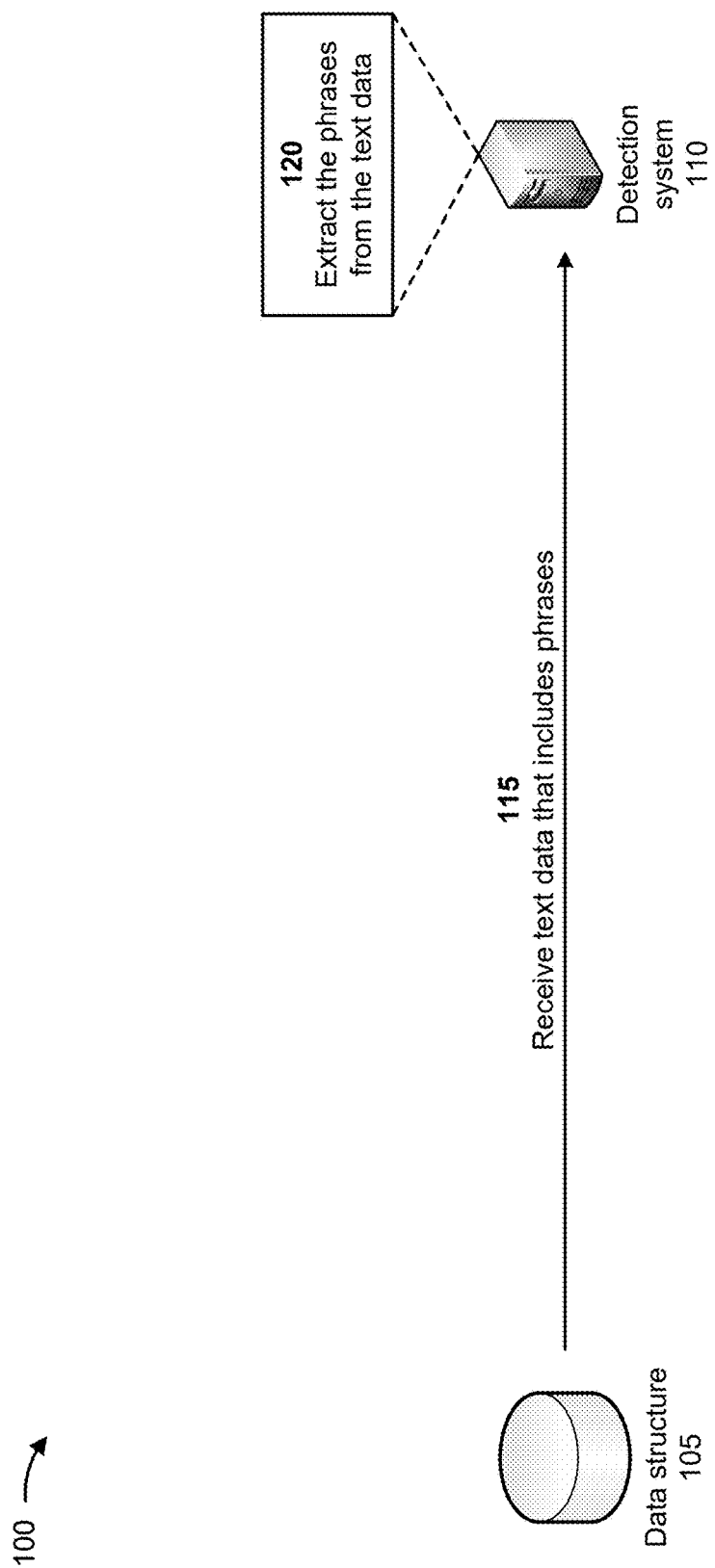

The following detailed description of example implementations refers to the accompanying drawings. The same reference numbers in different drawings may identify the same or similar elements.

Many NLP approaches begin by identifying sentences. However, due to semantic uncertainty of punctuation (e.g., a period), determining a sentence boundary is a significant problem for NLP approaches. For example, when a customer calls a support team, the call is converted into text data but the text data may not include proper punctuation (e.g., periods). Without proper punctuation, an NLP model (e.g., a machine learning model) processing the text data may not be able to determine the intent of the customer, and/or may generate erroneous intents causing results for insights and resolutions to be inaccurate or entirely incorrect. When multiple contexts exist within the same utterances of the text data, it is difficult to separate the same utterances in the text data. Hence, the NLP model fails to generate exact insights from the text data. Examples of text data from which it is difficult to determine sentence boundaries include call transcripts, clinical documents (e.g., discharge summaries, diagnosis reports, and/or the like), social media messages, and/or the like.

Thus, current techniques for determining a sentence boundary in text data consume computing resources (e.g., processing resources, memory resources, communication resources, and/or the like), networking resources, and/or other resources associated with processing text data with improper punctuation (e.g., lack of sentence boundaries) with an NLP model, generating erroneous results with an NLP model based on text data with improper punctuation, failing to generate useful information from an NLP model processing text data with improper punctuation, and/or the like.

Some implementations described herein provide a detection system that utilizes one or more machine learning models for sentence boundary detection. For example, the detection system may receive text data that includes phrases, may extract the phrases from the text data, and calculate question scores for the phrases. The detection system may determine whether the phrases are associated with single answers or multiple answers, may calculate single answer scores for the phrases associated with the single answers, and may calculate multiple answer scores for the phrases associated with the multiple answers. The detection system may extract, from the phrases, phrase data identifying grammar data, start tag data, and end tag data, and may process the phrase data, the single answer scores, and the multiple answer scores, with a machine learning model, to generate valid sentence scores for the text data. The detection system may identify, as a valid sentence, a group of phrases of the text data associated with a highest one of the valid sentence scores, and may add punctuation to the valid sentence to generate a final sentence. The detection system may perform one or more actions based on the final sentence.

In this way, the detection system utilizes one more machine learning models for sentence boundary detection. For example, the detection system may utilize phrase extraction, start tags, end tags, question scores, answer scores, and/or the like, with a machine learning model, to generate a validity scores of sentences formed from phrases. The detection system may identify valid sentences based on the validity scores of the sentences. The detection system may verify contextual segments and may group sentences based on context and features. The valid sentences generated by the detection system may be utilized to improve results (e.g., intents, sentiments, summaries, and/or the like) generated by an NLP model that processes the valid sentences. The detection system may be utilized with different domains, such as call transcripts, legal documents, abbreviations, medical documents, documents converted from images, and/or the like. Thus, the detection system may conserve computing resources, networking resources, and/or other resources that would have otherwise been consumed by processing text data with improper punctuation (e.g., lack of sentence boundaries) with an NLP model, generating erroneous results with an NLP model based on text data with improper punctuation, failing to generate useful information from an NLP model processing text data with improper punctuation, and/or the like.

FIGS. 1A-1H are diagrams of an example 100 associated with utilizing one or machine learning models for sentence boundary detection. As shown in FIGS. 1A-1H, example 100 includes a data structure 105 (e.g., a database, a table, a list, and/or the like) associated with a detection system 110. Further details of the data structure 105 and the detection system 110 are provided elsewhere herein.

As shown in FIG. 1A, and by reference number 115, the detection system 110 may receive text data that includes phrases. For example, the data structure 105 may store text data that is generated based on voice or video calls, interactions with chatbots, live chats, interactions with an interactive voice response (IVR) system, interactions with a search system, interactions with a support system, and/or the like. The data structure 105 may provide the text data to the detection system 110, and the detection system 110 may receive the text data from the data structure 105. In some implementations, the text data may include phrases of text. In some implementations, the detection system 110 may continuously receive the text data in real time from the data structure 105, may periodically receive the text data from the data structure 105, may receive the text data from the data structure 105 based on requesting the text data from the data structure 105, and/or the like. For example, the text data may include the text "what do i hit here are a few things to know we have * day return baba blah okay got it." In some implementations, the text data may include utterances that are difficult for an NLP model to parse (e.g., abbreviations, decimals in dates, decimals in time, and/or the like).

As further shown in FIG. 1A, and by reference number 120, the detection system 110 may extract the phrases from the text data. For example, the detection system 110 may identify potential candidates for the phrases. In order to identify the candidate phrases, the detection system 110 may perform tokenization of the text data to identify the candidate phrases, and may apply one or more NLP techniques to reduce the quantity of candidate phrases (e.g., restrict words with inflection forms to their base forms using stemming and lemmatization techniques, remove stop words and punctuation, utilize parts of speech (POS) tagging to filter out words with certain parts of speech, and/or the like). In some implementations, the detection system 110 may utilize named entity recognition (NER) to identify the candidate phrases, and may utilize collocation extraction to identify phrases that tend to appear more commonly.

The preliminary stage of identifying the candidate phrases can result in several phrases. Thus, the detection system 110 may select the best candidate phrases by determining which phrases are more relevant to the text data than other phrases (e.g., using statistical measures, using supervised machine learning models, using unsupervised machine learning models, and/or the like). The supervised machine learning models may reformulate the problem of phrase extraction to either classification or ranking problems and may select the best candidate phrases from the text data. The supervised machine learning models may include naive Bayes models, decision tree models, support vector machines, and/or the like. The unsupervised machine learning model may include graph-based ranking models. The graph-based ranking models may transform the text data into a graph with nodes representing candidate phrases and vertices representing relations among the candidate phrases. The graph-based ranking models may analyze the graph and may return the highest scoring candidate phrases.

The candidate phrases identified and selected by the detection system 110 may correspond to the phrases extracted from the text data. For example, the text data "what do i hit here are a few things to know we have * day return baba blah okay got it" may include the following phrases: "what do i hit," "what do i hit here," "here are a few things to know," "here are a few things," "we have * day return," "baba blah," "Okay," "baba blah okay," "got it," and "okay got it."

Figure 1B:
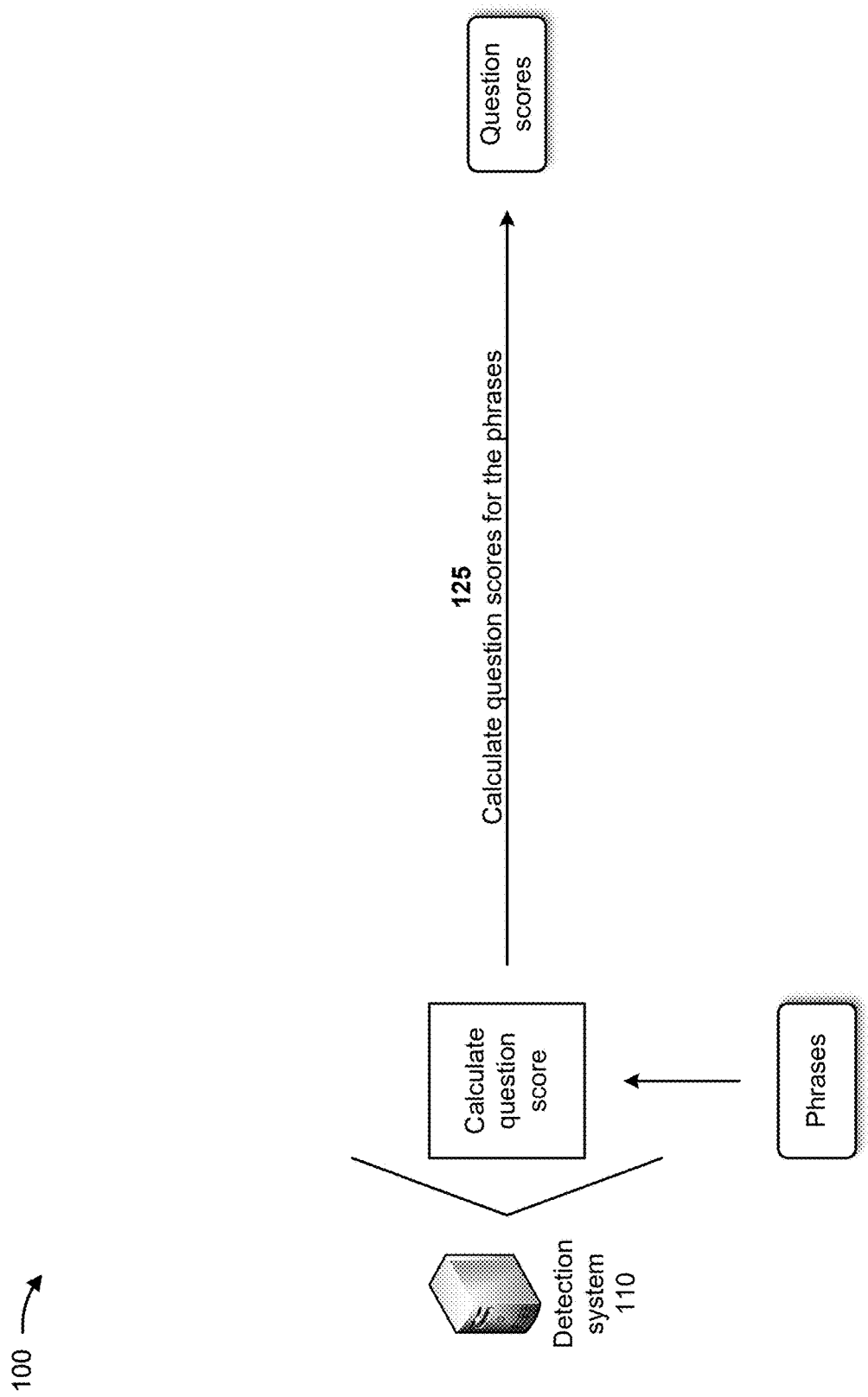

As shown in FIG. 1B, and by reference number 125, the detection system 110 may calculate question scores for the phrases. For example, the detection system 110 may calculate question scores that provide an indication of whether the phrases are questions. The detection system 110 may calculate the question scores based on identifying words associated with questions in the phrases, and determining whether the identified words are associated with a pattern. In one example, the detection system 110 may calculate a question score (e.g., 0.8, 0.9, and/or the like) for a phrase that includes one of more of the following: the term "how" (more detail), the term "what" (detail or thing), no question keywords or issues found based on a negative sentiment score, the term "which" (choice), the term "where" (place, location, position, or area), the term "why" (reason), starts with a verb (e.g., "Is it working"), the term "when" (time), the term "how long" (length of time), the term "how many" (count), or the term "who" (person). If the phrase is not associated with the pattern (e.g., fails to include one or more of the above), the detection system 110 may calculate another question score (e.g., 0.1, 0.2, and/or the like) for the phrase. In some implementations, the detection system 110 may determine that a phrase is a question when the question score for the phrase satisfies a threshold value (e.g., greater than 0.5, 0.6, and/or the like). Alternatively, the detection system 110 may determine that a phrase is an answer when the question score for the phrase fails to satisfy the threshold value (e.g., less than or equal to 0.5, 0.6, and/or the like).

In one example, the text data "what do i hit here are a few things to know we have * day return baba blah okay got it" may include the following question scores for the phrases: "what do i hit" (question score 0.8), "what do i hit here" (question score 0.8), "here are a few things to know" (question score 0.83), "here are a few things" (question score 0.83), "we have * day return" (question score 0.83), "baba blah" (question score 0.83), "Okay" (question score 0.83), "baba blah okay" (question score 0.83), "got it" (question score 0.83), and "okay got it" (question score 0.83).

Figure 1C:
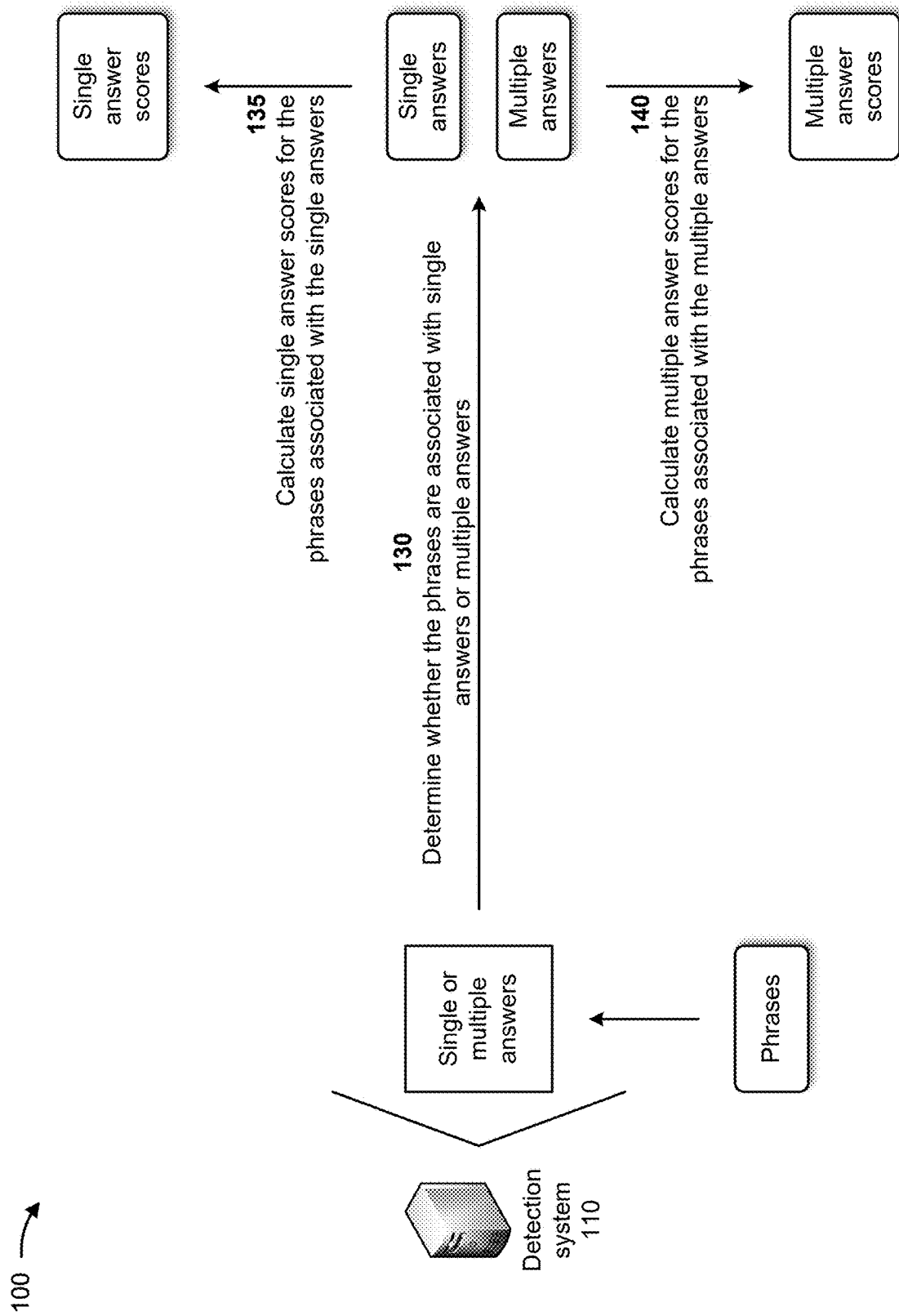

As shown in FIG. 1C, and by reference number 130, the detection system 110 may determine whether the phrases are associated with single answers or multiple answers. For example, for phrases that fail to satisfy the threshold value, the detection system 110 may determine whether such phrases are associated with single answers or multiple answers. In some implementations, the detection system 110 may determine whether the phrases are associated with single answers or multiple answers by extracting words from the phrases, and by extracting features (e.g., NERs, sentiments) from the words. The detection system 110 may determine distances between locations of the phrases and locations of questions identified by the detection system 110. The detection system 110 may associate the phrases with questions located closest to the phrases In one example, the detection system 110 may determine whether the phrases are associated with single answers or multiple answers (e.g., based on the associated questions) as follows: the question "how" may indicate that phrases are associated with multiple answers, the question "what" may indicate that phrases are associated with multiple answers, if no question keywords or issues found based on negative sentiment score may indicate that phrases are associated with multiple answers, the question "which" may indicate that phrases are associated with multiple answers, the question "where" may indicate that phrases are associated with multiple answers, the question "why" may indicate that phrases are associated with multiple answers, starts with verb may indicate that phrases are associated with single answers, the question "when" may indicate that phrases are associated with single answers, the question "how" may indicate that phrases are associated with single answers, the question "how" may indicate that phrases are associated with single answers, and the question "who" may indicate that phrases are associated with single answers.

As further shown in FIG. 1C, and by reference number 135, the detection system 110 may calculate single answer scores for the phrases associated with the single answers. For example, the detection system 110 may be associated with a recurrent neural network (RNN) model that includes one or more long short-term memory (LSTM) layers, one or more dense layers, a concatenation layer, and an output layer. In some implementations, the detection system 110 may process the phrases associated with the single answers, with the RNN model, to calculate the single answer scores for the phrases associated with the single answers.

As further shown in FIG. 1C, and by reference number 140, the detection system 110 may calculate multiple answer scores for the phrases associated with the multiple answers. For example, the detection system 110 may be associated with another RNN model that includes one or more LSTM layers, a concatenation layer, and an output layer. In some implementations, the detection system 110 may process the phrases associated with the multiple answers, with the other RNN model, to calculate the multiple answer scores for the phrases associated with the multiple answers.

Figure 1D:
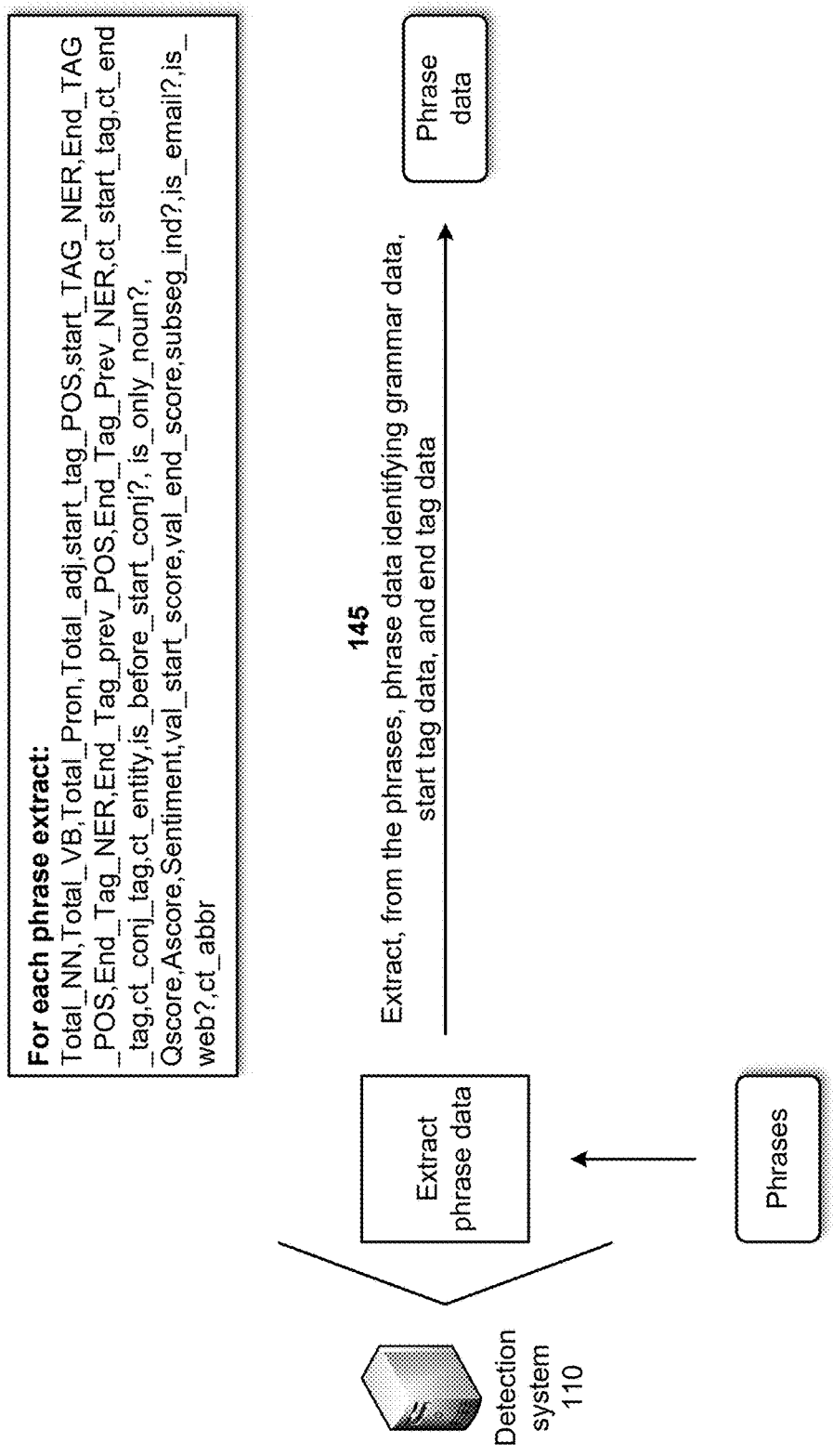

As shown in FIG. 1D, and by reference number 145, the detection system 110 may extract, from the phrases, phrase data identifying grammar data, start tag data, and end tag data. For example, the detection system 110 may extract, from the phrases, the phrase data identifying the grammar data, the start tag data, and the end tag data; the question scores, the answer scores, sentiment, start tag scores, end tag scores, and/or the like. In some implementations, the grammar data may include data identifying a total quantity of nouns, a total quantity of verbs, a total quantity of pronouns, a total quantity of adjectives, and/or the like in the phrases. In some implementations, the start tag data may include data identifying start tag parts of speech, start tag NERs, a quantity of start tags, and/or the like. In some implementations, the end tag data may include data identifying end tag parts of speech, end tag NERs, end tag previous parts of speech, end tag previous NERs, a quantity of end tags, and/or the like.

As shown in FIG. 1E, and by reference number 150, the detection system 110 may process the phrase data, the single answer scores, and the multiple answer scores, with a machine learning model, to generate valid sentence scores for the text data. For example, the detection system 110 may be associated with a machine learning model. In some implementations, the machine learning model may be an RNN model with an embedding layer, an LSTM layer, one or more dense layers, and a concatenation layer. The detection system 110 may utilize the machine learning model to generate the valid sentence scores for the text data based on the phrase data, the single answer scores, and the multiple answer scores. The valid sentence scores may provide an indication of which phrases of the text data are valid sentences. In one example, the text data "what do i hit here are a few things to know we have * day return baba blah okay got it" may include the following valid sentence scores for the phrases: "what do i hit" (sentence score 0.86), "what do i hit here" (sentence score 0.66), "here are a few things to know" (sentence score 0.87), "here are a few things" (sentence score 0.66), "we have * day return" (sentence score 0.85), "baba blah" (sentence score 0.89), "Okay" (sentence score 0.95), "baba blah okay" (sentence score 0.74), "got it" (sentence score 0.93), and "okay got it" (sentence score 0.71).

Figure 1F:
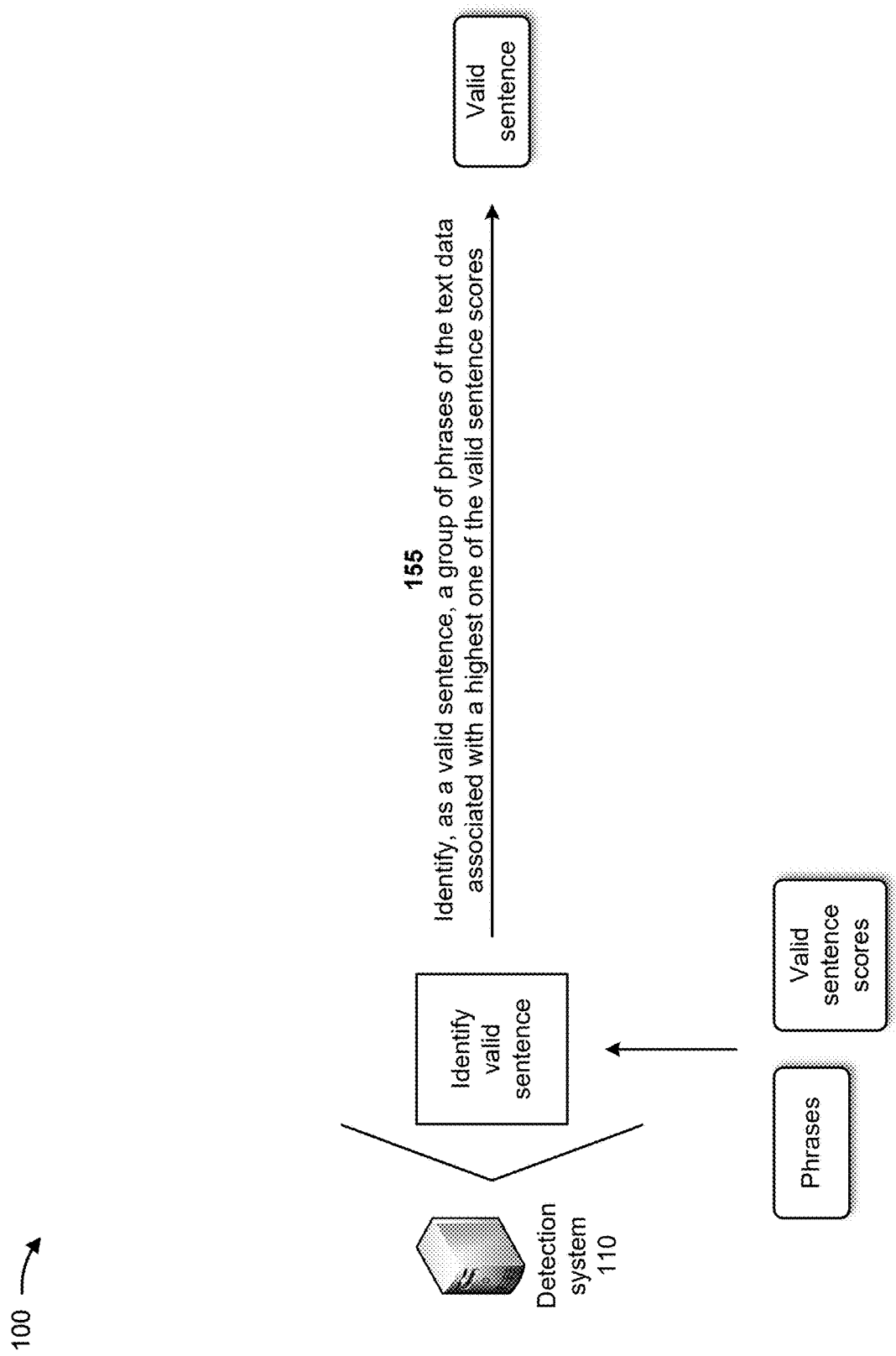

As shown in FIG. 1F, and by reference number 155, the detection system 110 may identify, as a valid sentence, a group of phrases of the text data associated with a highest one of the valid sentence scores. For example, the detection system 110 may rank the phrases of the text data based on the valid sentence scores, and may select, as the valid sentence, the highest ranked group of phrases associated with the highest one of the valid sentence scores. In some implementations, the detection system 110 may identify unique phrases without overlapping and possible valid sentences (e.g., "we have * day return"). For remaining phrases that include some words overlapping with other phrases, the detection system 110 may select a top valid sentence score phrase and may mark the phrase as a valid sentence. In some implementations, the detection system 110 may remove similar phrases, e.g. using Jaccard similarity. In one example, for the text data "what do i hit here are a few things to know we have * day return baba blah okay got it", the detection system 110 may identify the following valid sentence "what do i hit, here are a few things to know, we have * day return, baba blah, Okay, Got it."

Figure 1G:
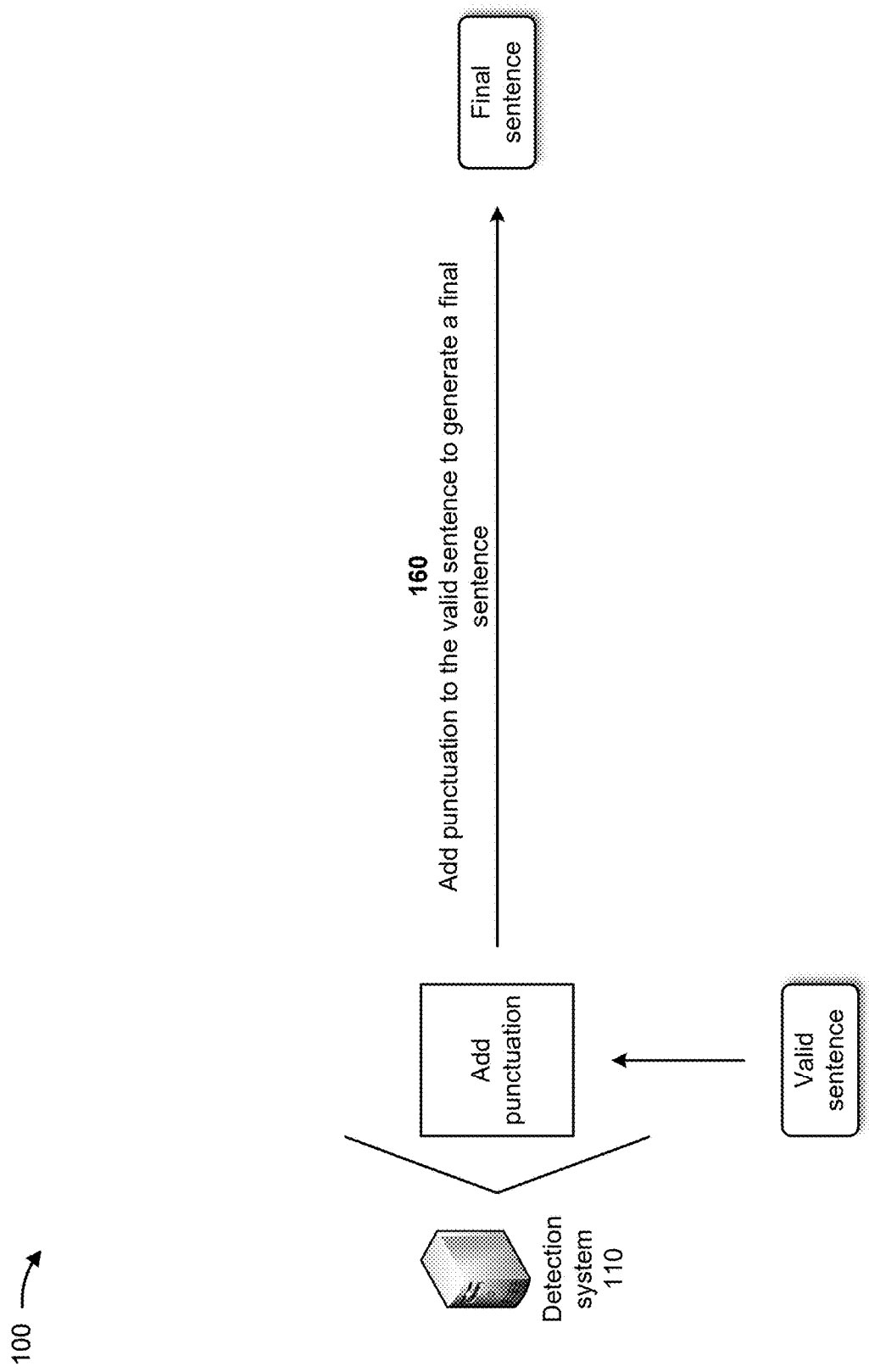

As shown in FIG. 1G, and by reference number 160, the detection system 110 may add punctuation to the valid sentence to generate a final sentence. For example, the detection system 110 add relevant punctuation (e.g., a question mark (?), an exclamation point (!), a period (.), a comma (,), and/or the like) to the valid sentence to generate the final sentence. In some implementations, if a question score for the valid sentence satisfies a threshold value (e.g., >0.5), the detection system 110 may add a question mark to the end of the valid sentence. If a sentiment of the valid sentence satisfies a threshold value (e.g., >0.9), the detection system 110 may add an exclamation point to the end of the valid sentence. Otherwise, the detection system 110 may add a period to the end of the valid sentence or may add a comma to the end of the valid sentence (e.g., when the valid sentence connects with another sentence). In one example, for the text data "what do i hit here are a few things to know we have * day return baba blah okay got it", the detection system 110 may generate the following final sentence "What do i hit? Here are a few things to know. We have * day return. Baba blah. Okay. Got it."

Figure 1H:
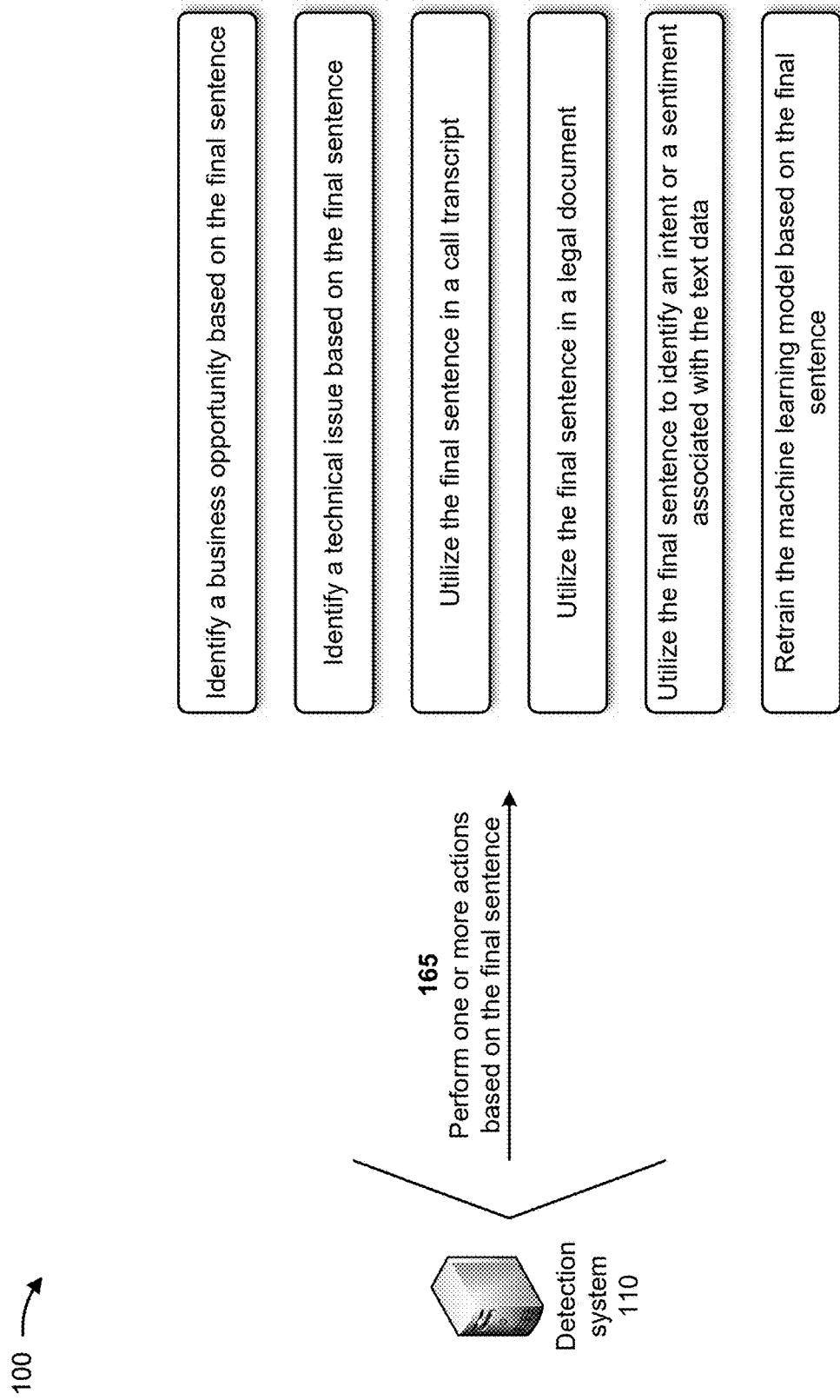

As shown in FIG. 1H, and by reference number 165, the detection system 110 may perform one or more actions based on the final sentence. In some implementations, performing the one or more actions includes the detection system 110 identifying a business opportunity based on the final sentence. For example, the detection system 110 may process the final sentence, with an NLP model, to generate an indication of a business opportunity (e.g., a sale of a product or a service). The detection system 110 may follow up on the business opportunity to ensure that the opportunity is not missed. In this way, the detection system 110 may conserve computing resources, networking resources, and/or other resources that would have otherwise been consumed by processing text data with improper punctuation with an NLP model.

In some implementations, performing the one or more actions includes the detection system 110 identifying a technical issue based on the final sentence. For example, the detection system 110 may process the final sentence, with an NLP model, to generate an indication of a technical issue (e.g., network congestion, disabled equipment, and/or the like). The detection system 110 may follow up on the technical issue to ensure that the technical issue is addressed. In this way, the detection system 110 may conserve computing resources, networking resources, and/or other resources that would have otherwise been consumed by generating erroneous results with an NLP model based on text data with improper punctuation.

In some implementations, performing the one or more actions includes the detection system 110 utilizing the final sentence in a call transcript. For example, the text data may be a call transcript stored by the data structure 105. The detection system 110 may modify the call transcript to include the final sentence, and may provide the modified call transcript to the data structure 105. The modified call transcript may be utilized to search for technical issues, opportunities, and/or the like. In this way, the detection system 110 may conserve computing resources, networking resources, and/or other resources that would have otherwise been consumed by failing to generate useful information from an NLP model processing text data with improper punctuation.

In some implementations, performing the one or more actions includes the detection system 110 utilizing the final sentence in a legal document. For example, the text data may be a legal or court document (e.g., with case names, court names, judge names, legal precedent, and/or the like) stored by the data structure 105. The detection system 110 may modify the legal document to include the final sentence, and may provide the modified legal document to the data structure 105. The modified legal document may be utilized to perform legal research for court cases. In this way, the detection system 110 may conserve computing resources, networking resources, and/or other resources that would have otherwise been consumed by processing text data with improper punctuation (e.g., lack of sentence boundaries) with an NLP model.

In some implementations, performing the one or more actions includes the detection system 110 utilizing the final sentence to identify an intent or a sentiment associated with the text data. For example, the detection system 110 may utilize deep learning techniques and NLP with the final sentence to extract the intents of the text data. In another example, the detection system 110 may utilize a sentiment analysis (e.g., an NLP technique) with the final sentence to determine whether the text data is positive, negative or neutral (e.g., to help a business monitor brand and product sentiment in customer feedback and understand customer needs). In this way, the detection system 110 may conserve computing resources, networking resources, and/or other resources that would have otherwise been consumed by generating erroneous results with an NLP model based on text data with improper punctuation.

In some implementations, performing the one or more actions includes the detection system 110 retraining the machine learning model based on the final sentence. For example, the detection system 110 may utilize the final sentence as additional training data for retraining the machine learning model, thereby increasing the quantity of training data available for training the machine learning model. Accordingly, the detection system 110 may conserve computing resources associated with identifying, obtaining, and/or generating historical data for training the machine learning model relative to other systems for identifying, obtaining, and/or generating historical data for training machine learning models.

In this way, the detection system 110 utilizes one or more machine learning models for sentence boundary detection. For example, the detection system 110 may utilize phrase extraction, start tags, end tags, question scores, answer scores, and/or the like, with a machine learning model, to generate a validity scores of sentences formed from phrases. The detection system 110 may identify valid sentences based on the validity scores of the sentences. The detection system 110 may verify contextual segments and may group sentences based on context and features. The valid sentences generated by the detection system 110 may be utilized to improve results generated by an NLP model that processes the valid sentences. The detection system 110 may be utilized with different domains, such as call transcripts, legal documents, abbreviations, medical documents, documents converted from images, and/or the like. Thus, the detection system 110 may conserve computing resources, networking resources, and/or other resources that would have otherwise been consumed by processing text data with improper punctuation (e.g., lack of sentence boundaries) with an NLP model, generating erroneous results with an NLP model based on text data with improper punctuation, failing to generate useful information from an NLP model processing text data with improper punctuation, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
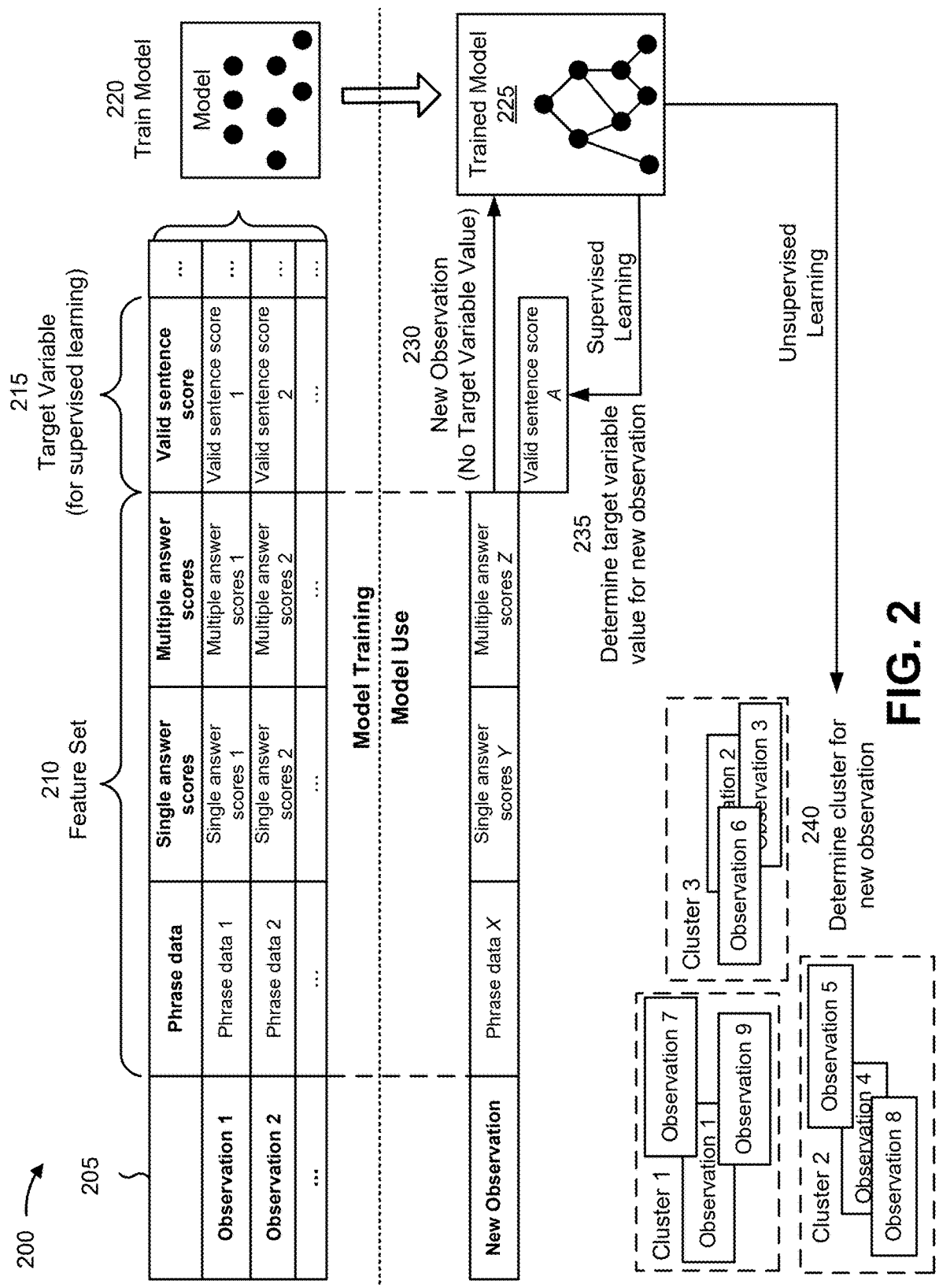
FIG. 2 is a diagram illustrating an example of training and using a machine learning model.

FIG. 2 is a diagram illustrating an example 200 of training and using a machine learning model for sentence boundary detection. The machine learning model training and usage described herein may be performed using a machine learning system. The machine learning system may include or may be included in a computing device, a server, a cloud computing environment, and/or the like, such as the detection system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the detection system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the detection system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of phrase data, a second feature of single answer scores, a third feature of multiple answer scores, and so on. As shown, for a first observation, the first feature may have a value of phrase data 1, the second feature may have a value of single answer scores 1, the third feature may have a value of multiple answer scores 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labeled "valid sentence score" and may include a value of valid sentence score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of phrase data X, a second feature of single answer scores Y, a third feature of multiple answer scores Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of valid sentence score A for the target variable of the valid sentence score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a phrase data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a single answer scores cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process for sentence boundary detection. The machine learning system enables recognition and/or identification of tens, hundreds, thousands, or millions of features and/or feature values for tens, hundreds, thousands, or millions of observations, thereby increasing accuracy and consistency and reducing delay associated with detecting a sentence boundary relative to requiring computing resources to be allocated for tens, hundreds, or thousands of operators to manually detect a sentence boundary.

As indicated above, FIG. 2 is provided as an example. Other examples may differ from what is described in connection with FIG. 2.

Figure 3:
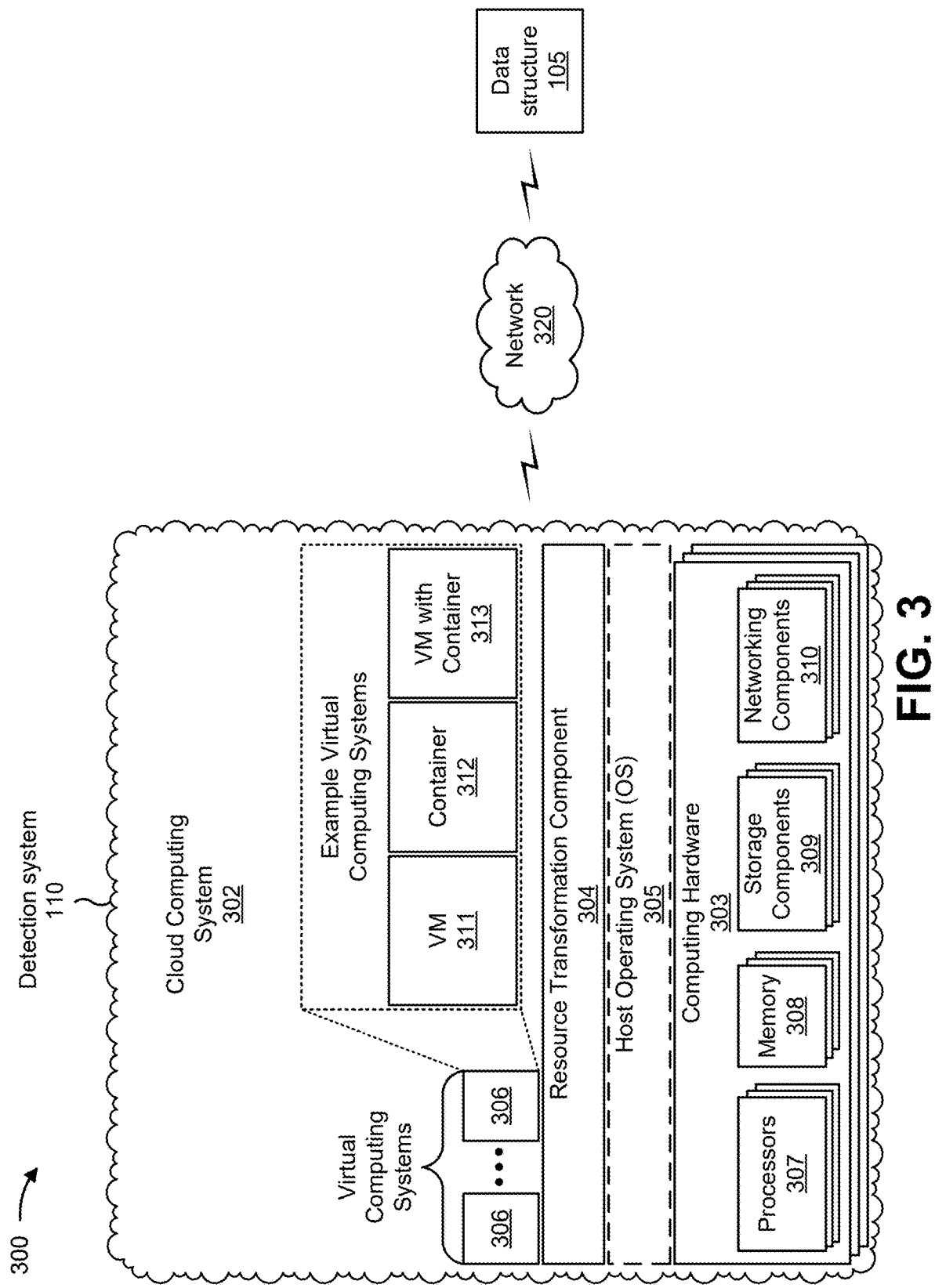
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the detection system 110, which may include one or more elements of and/or may execute within a cloud computing system 302. The cloud computing system 302 may include one or more elements 303-313, as described in more detail below. As further shown in FIG. 3, the environment 300 may include the data structure 105 and/or a network 320. Devices and/or elements of the environment 300 may interconnect via wired connections and/or wireless connections.

The data structure 105 may include one or more devices capable of receiving, generating, storing, processing, and/or providing information, as described elsewhere herein. The data structure 105 may include a communication device and/or a computing device. For example, the data structure 105 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 105 may communicate with one or more other devices of the environment 300, as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the detection system 110 may include one or more elements 303-313 of the cloud computing system 302, may execute within the cloud computing system 302, and/or may be hosted within the cloud computing system 302, in some implementations, the detection system 110 may not be cloud-based (e.g., may be implemented outside of a cloud computing system) or may be partially cloud-based. For example, the detection system 110 may include one or more devices that are not part of the cloud computing system 302, such as the device 400 of FIG. 4, which may include a standalone server or another type of computing device. The detection system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
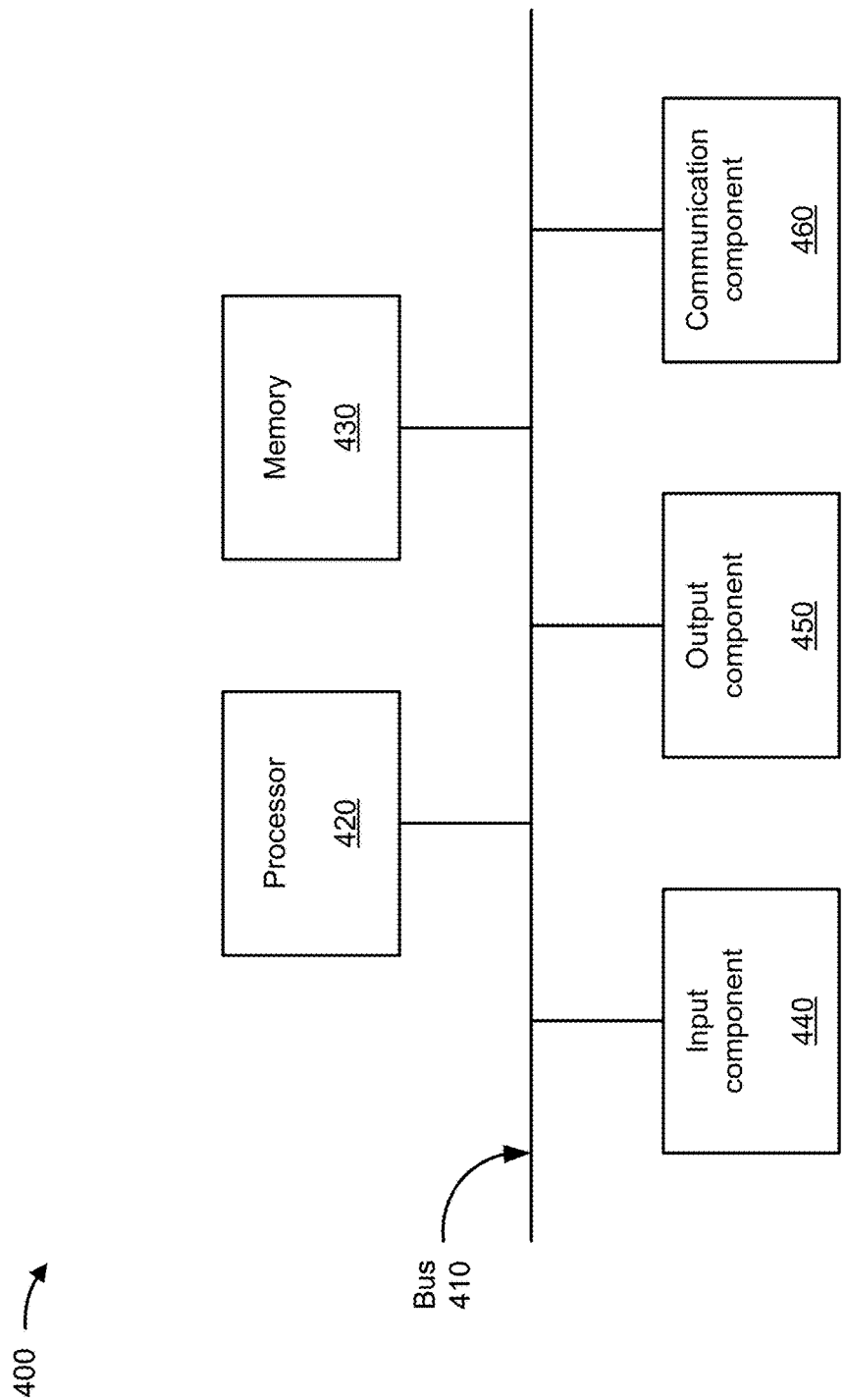
FIG. 4 is a diagram of example components of one or more devices of FIG. 3.

FIG. 4 is a diagram of example components of a device 400, which may correspond to the data structure 105 and/or the detection system 110. In some implementations, the data structure 105 and/or the detection system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
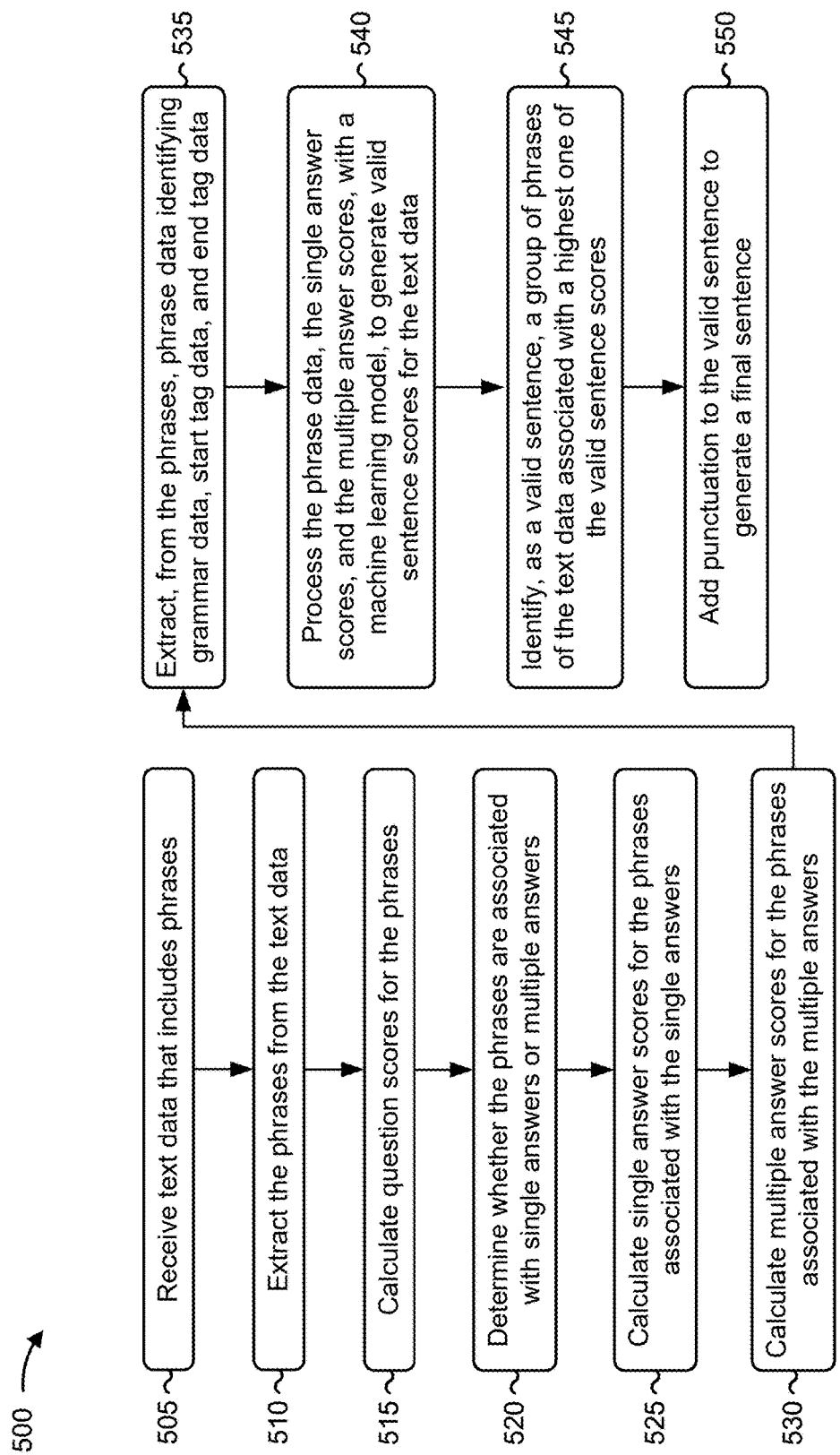
FIG. 5 is a flowchart of an example process for utilizing one or more machine learning models for sentence boundary detection.

FIG. 5 is a flowchart of an example process 500 for utilizing one or more machine learning models for sentence boundary detection. In some implementations, one or more process blocks of FIG. 5 may be performed by a device (e.g., the detection system 110). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving text data that includes phrases (block 505). For example, the device may receive text data that includes phrases, as described above. In some implementations, the text data includes one or more of an abbreviation, a decimal in a date, or a decimal in a time.

As further shown in FIG. 5, process 500 may include extracting the phrases from the text data (block 510). For example, the device may extract the phrases from the text data, as described above.

As further shown in FIG. 5, process 500 may include calculating question scores for the phrases (block 515). For example, the device may calculate question scores for the phrases, as described above.

As further shown in FIG. 5, process 500 may include determining whether the phrases are associated with single answers or multiple answers (block 520). For example, the device may determine whether the phrases are associated with single answers or multiple answers, as described above.

As further shown in FIG. 5, process 500 may include calculating single answer scores for the phrases associated with the single answers (block 525). For example, the device may calculate single answer scores for the phrases associated with the single answers, as described above. In some implementations, calculating the single answer scores for the phrases associated with the single answers includes processing the phrases associated with the single answers, with a recurrent neural network model, to calculate the single answer scores.

As further shown in FIG. 5, process 500 may include calculating multiple answer scores for the phrases associated with the multiple answers (block 530). For example, the device may calculate multiple answer scores for the phrases associated with the multiple answers, as described above. In some implementations, calculating the multiple answer scores for the phrases associated with the multiple answers includes processing the phrases associated with the multiple answers, with a recurrent neural network model, to calculate the single answer scores.

As further shown in FIG. 5, process 500 may include extracting, from the phrases, phrase data identifying grammar data, start tag data, and end tag data (block 535). For example, the device may extract, from the phrases, phrase data identifying grammar data, start tag data, and end tag data, as described above. In some implementations, the grammar data includes data identifying a total quantity of nouns, a total quantity of verbs, a total quantity of pronouns, or a total quantity of adjectives in the phrases. In some implementations, the start tag data includes data identifying start tag parts of speech, start tag named entity recognitions, or a quantity of start tags. In some implementations, the end tag data includes data identifying end tag parts of speech, end tag NERs, end tag previous parts of speech, end tag previous NERs, or a quantity of end tags.

As further shown in FIG. 5, process 500 may include processing the phrase data, the single answer scores, and the multiple answer scores, with a machine learning model, to generate valid sentence scores for the text data (block 540). For example, the device may process the phrase data, the single answer scores, and the multiple answer scores, with a machine learning model, to generate valid sentence scores for the text data, as described above. In some implementations, the machine learning model is a recurrent neural network model with an embedding layer, a long short-term memory layer, one or more dense layers, and a concatenation layer.

As further shown in FIG. 5, process 500 may include identifying, as a valid sentence, a group of phrases of the text data associated with a highest one of the valid sentence scores (block 545). For example, the device may identify, as a valid sentence, a group of phrases of the text data associated with a highest one of the valid sentence scores, as described above.

As further shown in FIG. 5, process 500 may include adding punctuation to the valid sentence to generate a final sentence (block 550). For example, the device may add punctuation to the valid sentence to generate a final sentence, as described above. In some implementations, adding punctuation to the valid sentence to generate the final sentence includes determining which punctuation to add to the valid sentence, and adding the determined punctuation to the valid sentence to generate the final sentence.

In some implementations, process 500 includes processing the final sentence, with a natural language processing model, to generate natural language processing results. In some implementations, process 500 includes performing one or more actions based on the final sentence. In some implementations, performing the one or more actions includes one or more of identifying a business opportunity based on the final sentence, identifying a technical issue based on the final sentence, or utilizing the final sentence in a call transcript. In some implementations, performing the one or more actions includes one or more of utilizing the final sentence in a legal document, utilizing the final sentence to identify an intent or a sentiment associated with the text data, or retraining the machine learning model based on the final sentence.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   calculating, by a device, question scores for phrases extracted from text data;
   determining, by the device, whether the phrases are associated with single answers or multiple answers;
   calculating, by the device, single answer scores for the phrases associated with the single answers;
   calculating, by the device, multiple answer scores for the phrases associated with the multiple answers;
   extracting, by the device and from the phrases, phrase data identifying grammar data, start tag data, and end tag data;
   processing, by the device, the phrase data, the single answer scores, and the multiple answer scores, with a machine learning model, to generate valid sentence scores for the text data;
   identifying, by the device and as a valid sentence, a group of phrases of the text data associated with a highest one of the valid sentence scores; and
   adding, by the device, punctuation to the valid sentence to generate a final sentence.

2. The method of claim 1, further comprising:
   processing the final sentence, with a natural language processing model, to generate natural language processing results.

3. The method of claim 1, further comprising:
   performing one or more actions based on the final sentence.

4. The method of claim 3, wherein performing the one or more actions comprises one or more of:
   identifying a business opportunity based on the final sentence;
   identifying a technical issue based on the final sentence; or
   utilizing the final sentence in a call transcript.

5. The method of claim 3, wherein performing the one or more actions comprises one or more of:
   utilizing the final sentence in a legal document;
   utilizing the final sentence to identify an intent or a sentiment associated with the text data; or retraining the machine learning model based on the final sentence.

6. The method of claim 1, wherein calculating the single answer scores for the phrases associated with the single answers comprises:
processing the phrases associated with the single answers, with a recurrent neural network model, to calculate the single answer scores.

7. The method of claim 1, wherein calculating the multiple answer scores for the phrases associated with the multiple answers comprises:
processing the phrases associated with the multiple answers, with a recurrent neural network model, to calculate the single answer scores.

8. A device, comprising:
one or more processors configured to:
receive text data that includes phrases;
extract the phrases from the text data;
calculate question scores for the phrases;
determine whether the phrases are associated with single answers or multiple answers;
calculate single answer scores for the phrases associated with the single answers;
calculate multiple answer scores for the phrases associated with the multiple answers;
extract, from the phrases, phrase data identifying grammar data, start tag data, and end tag data;
process the phrase data, the single answer scores, and the multiple answer scores, with a machine learning model, to generate valid sentence scores for the text data;
identify, as a valid sentence, a group of phrases of the text data associated with a highest one of the valid sentence scores;
add punctuation to the valid sentence to generate a final sentence; and
process the final sentence, with a natural language processing model, to generate natural language processing results.

9. The device of claim 8, wherein the grammar data includes data identifying a total quantity of nouns, a total quantity of verbs, a total quantity of pronouns, or a total quantity of adjectives in the phrases.

10. The device of claim 8, wherein the start tag data includes data identifying start tag parts of speech, start tag named entity recognitions, or a quantity of start tags.

11. The device of claim 8, wherein the end tag data includes data identifying end tag parts of speech, end tag named entity recognitions (NERs), end tag previous parts of speech, end tag previous NERs, or a quantity of end tags.

12. The device of claim 8, wherein the machine learning model is a recurrent neural network model with an embedding layer, a long short-term memory layer, one or more dense layers, and a concatenation layer.

13. The device of claim 8, wherein the one or more processors, to add punctuation to the valid sentence to generate the final sentence, are configured to:
determine which punctuation to add to the valid sentence; and
add the determined punctuation to the valid sentence to generate the final sentence.

14. The device of claim 8, wherein the text data includes one or more of an abbreviation, a decimal in a date, or a decimal in a time.

15. A non-transitory computer-readable medium storing a set of instructions, the set of instructions comprising:
one or more instructions that, when executed by one or more processors of a device, cause the device to:
receive text data that includes phrases;
extract the phrases from the text data;
calculate question scores for the phrases;
determine whether the phrases are associated with single answers or multiple answers;
calculate single answer scores for the phrases associated with the single answers;
calculate multiple answer scores for the phrases associated with the multiple answers;
extract, and from the phrases, phrase data identifying grammar data, start tag data, and end tag data;
process the phrase data, the single answer scores, and the multiple answer scores, with a machine learning model, to generate valid sentence scores for the text data;
identify, as a valid sentence, a group of phrases of the text data associated with a highest one of the valid sentence scores;
add punctuation to the valid sentence to generate a final sentence; and
perform one or more actions based on the final sentence.

16. The non-transitory computer-readable medium of claim 15, wherein the one or more instructions, that cause the device to perform the one or more actions, cause the device to one or more of:
identify a business opportunity based on the final sentence;
identify a technical issue based on the final sentence;
utilize the final sentence in a call transcript;
utilize the final sentence in a legal document;
utilize the final sentence to identify an intent or a sentiment associated with the text data; or
retrain the machine learning model based on the final sentence.

17. The non-transitory computer-readable medium of claim 15, wherein the one or more instructions, that cause the device to calculate the single answer scores for the phrases associated with the single answers, cause the device to:
process the phrases associated with the single answers, with a recurrent neural network model, to calculate the single answer scores.

18. The non-transitory computer-readable medium of claim 15, wherein the one or more instructions, that cause the device to calculate the multiple answer scores for the phrases associated with the multiple answers, cause the device to:
process the phrases associated with the multiple answers, with a recurrent neural network model, to calculate the single answer scores.

19. The non-transitory computer-readable medium of claim 15, wherein the machine learning model is a recurrent neural network model with an embedding layer, a long short-term memory layer, one or more dense layers, and a concatenation layer.

20. The non-transitory computer-readable medium of claim 15, wherein the one or more instructions, that cause the device to add punctuation to the valid sentence to generate the final sentence, cause the device to:
determine which punctuation to add to the valid sentence; and add the determined punctuation to the valid sentence to generate the final sentence.

\* \* \* \* \*